United States Patent
Bridges

(10) Patent No.: US 6,607,200 B1
(45) Date of Patent: Aug. 19, 2003

(54) STROLLER DEVICE

(76) Inventor: Sonja E. Bridges, 12013 CR 283 E., Whitehouse, TX (US) 75791

(*) Notice: Subject to any disclaimer, the term of this patent is extended or adjusted under 35 U.S.C. 154(b) by 0 days.

(21) Appl. No.: 09/939,029

(22) Filed: Aug. 24, 2001

(51) Int. Cl.[7] .............................................. B62B 7/04
(52) U.S. Cl. .............................. 280/47.35; 280/47.38; 280/62
(58) Field of Search .......................... 280/47.34, 47.35, 280/47.371, 47.38, 47.4, 62, 642, 644, 647, 650, 657, 47.25; 297/452.13

(56) References Cited

U.S. PATENT DOCUMENTS

| D160,598 S | * | 10/1950 | Heideman ................ 280/47.38 |
| 2,993,702 A | * | 7/1961 | Gill ........................ 280/47.38 |
| 3,894,748 A | * | 7/1975 | Ratcliff ................... 280/47.35 |
| 3,997,213 A | * | 12/1976 | Smith et al. ............ 297/452.13 |
| 4,102,010 A | * | 7/1978 | Lazazzero ............... 280/47.38 |
| 4,369,987 A | * | 1/1983 | Witherell .................... 280/644 |
| D322,420 S | * | 12/1991 | Hawkes ...................... 280/650 |
| 5,084,921 A | * | 2/1992 | Hicks, Jr. ...................... 5/81.1 |
| 5,141,241 A | * | 8/1992 | Avila ...................... 280/47.371 |
| 5,143,335 A | * | 9/1992 | Frankel ....................... 284/215 |
| 5,184,835 A |   | 2/1993 | Huang |
| 5,224,720 A | * | 7/1993 | Chaw et al. .................. 280/62 |
| 5,265,892 A | * | 11/1993 | Said ........................... 280/654 |
| D350,923 S |   | 9/1994 | Schmidlin et al. |
| 5,344,171 A | * | 9/1994 | Garforth-Bles .......... 280/47.38 |
| 5,364,119 A | * | 11/1994 | Leu ............................ 280/647 |
| 5,464,183 A |   | 11/1995 | McConnell et al. |
| 5,468,009 A |   | 11/1995 | Eyman et al. |
| 5,536,033 A | * | 7/1996 | Hinkston ................... 280/642 |
| 5,738,410 A |   | 4/1998 | Stroud et al. |
| 5,765,855 A | * | 6/1998 | Chiu ......................... 280/642 |
| 5,765,856 A |   | 6/1998 | Kiser |
| 6,099,022 A | * | 8/2000 | Pring ......................... 280/648 |
| 6,402,166 B1 | * | 6/2002 | Chiu ....................... 280/47.38 |
| 2002/0093160 A1 | * | 7/2002 | Mendenhall ............ 280/47.38 |

* cited by examiner

Primary Examiner—Brian L. Johnson
Assistant Examiner—Jeffrey J. Restifo

(57) ABSTRACT

A stroller device for transporting a child who is too large for a baby stroller. The stroller device includes a first panel and a second panel each having a first edge, a second edge, a third edge and a fourth edge wherein the first and second edges are positioned opposite to each other. A container has a bottom wall, a front wall, a back wall, and a pair of side walls. The container has an open top side. The container is attached to and positioned between the first and second panels such that the bottom wall is generally coplanar with the first and second panels. Each of a pair of wheel assemblies is attached to one of the first and second panels. A handle assembly is attached to the upper surface of the first panel. A seat member is attached to the handle assembly and extends over the container.

11 Claims, 4 Drawing Sheets

STROLLER DEVICE

BACKGROUND OF THE INVENTION

1. Field of the Invention

The present invention relates to strollers and more particularly pertains to a new stroller device for transporting a child who is too large for a baby stroller.

2. Description of the Prior Art

The use of strollers is known in the prior art. More specifically, strollers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,468,009; 5,464,183; 5,738,140; 5,148,835; U.S. Des. Pat. No. 350,923; and U.S. Pat. No. 5,765,856.

While these devices fulfill their respective, particular objectives and requirements, the aforementioned patents do not disclose a new stroller device. The inventive device includes a first panel having a first edge, a second edge, a third edge and a fourth edge wherein the first and second edges are positioned opposite to each other. A second panel has a first edge, a second edge, a third edge, and a fourth edge wherein the first and second edges of the second panel are opposite to each other. A container has a bottom wall, a front wall, a back wall, and a pair of side walls. The container has an open top side. The container is attached to and positioned between the first and second panels such that the bottom wall is generally coplanar with the first and second panels. Each of a pair of wheel assemblies is attached to one of the first and second panels. A handle assembly is attached to the upper surface of the first panel. A seat member is attached to the handle assembly and extends over the container.

In these respects, the stroller device according to the present invention substantially departs from the conventional concepts and designs of the prior art, and in so doing provides an apparatus primarily developed for the purpose of transporting a child who is too large for a baby stroller.

SUMMARY OF THE INVENTION

In view of the foregoing disadvantages inherent in the known types of strollers now present in the prior art, the present invention provides a new stroller device construction wherein the same can be utilized for transporting a child who is too large for a baby stroller.

The general purpose of the present invention, which will be described subsequently in greater detail, is to provide a new stroller device apparatus and method which has many of the advantages of the strollers mentioned heretofore and many novel features that result in a new stroller device which is not anticipated, rendered obvious, suggested, or even implied by any of the prior art strollers, either alone or in any combination thereof.

To attain this, the present invention generally comprises a first panel having a first edge, a second edge, a third edge and a fourth edge wherein the first and second edges are positioned opposite to each other. A second panel has a first edge, a second edge, a third edge, and a fourth edge wherein the first and second edges of the second panel are opposite to each other. A container has a bottom wall, a front wall, a back wall, and a pair of side walls. The container has an open top side. The container is attached to and positioned between the first and second panels such that the bottom wall is generally coplanar with the first and second panels. Each of a pair of wheel assemblies is attached to one of the first and second panels. A handle assembly is attached to the upper surface of the first panel. A seat member is attached to the handle assembly and extends over the container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new stroller device apparatus and method which has many of the advantages of the strollers mentioned heretofore and many novel features that result in a new stroller device which is not anticipated, rendered obvious, suggested, or even implied by any of the prior art strollers, either alone or in any combination thereof.

It is another object of the present invention to provide a new stroller device which may be easily and efficiently manufactured and marketed.

It is a further object of the present invention to provide a new stroller device which is of a durable and reliable construction.

An even further object of the present invention is to provide a new stroller device which is susceptible of a low cost of manufacture with regard to both materials and labor, and which accordingly is then susceptible of low prices of sale to the consuming public, thereby making such stroller device economically available to the buying public.

Still yet another object of the present invention is to provide a new stroller device which provides in the apparatuses and methods of the prior art some of the advantages thereof, while simultaneously overcoming some of the disadvantages normally associated therewith.

Still another object of the present invention is to provide a new stroller device for transporting a child who is too large for a baby stroller.

Yet another object of the present invention is to provide a new stroller device which includes a first panel having a first edge, a second edge, a third edge and a fourth edge wherein the first and second edges are positioned opposite to each other. A second panel has a first edge, a second edge, a third edge, and a fourth edge wherein the first and second edges of the second panel are opposite to each other. A container has a bottom wall, a front wall, a back wall, and a pair of side walls. The container has an open top side. The container is attached to and positioned between the first and second panels such that the bottom wall is generally coplanar with the first and second panels. Each of a pair of wheel assemblies is attached to one of the first and second panels. A handle assembly is attached to the upper surface of the first panel. A seat member is attached to the handle assembly and extends over the container.

Still yet another object of the present invention is to provide a new stroller device that is larger than a conventional baby stroller and has a sling type seat for allow larger children to sit in the device. This allows adults to transport a child over larger distances which would otherwise tire the child if that child was walking.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
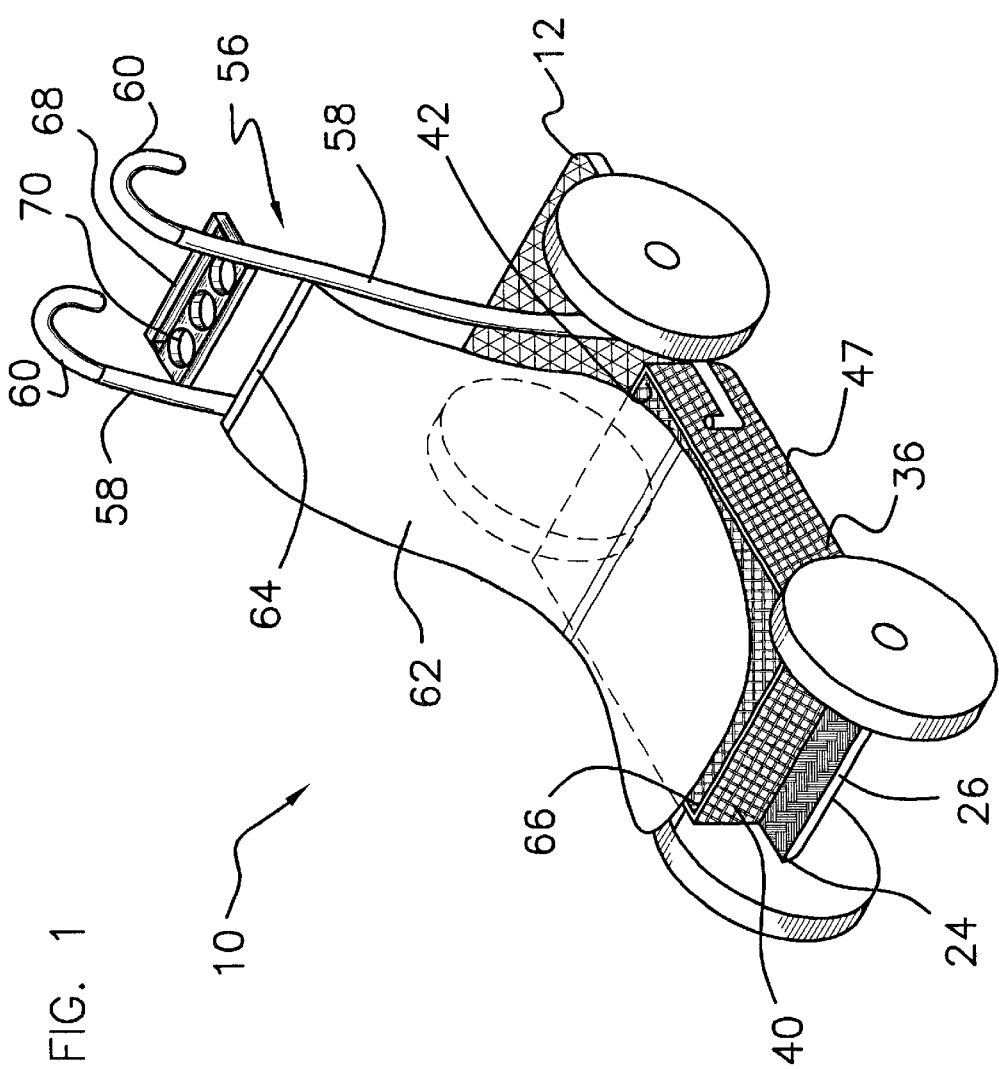
FIG. 1 is a schematic perspective view of a new stroller device according to the present invention.
Figure 2:
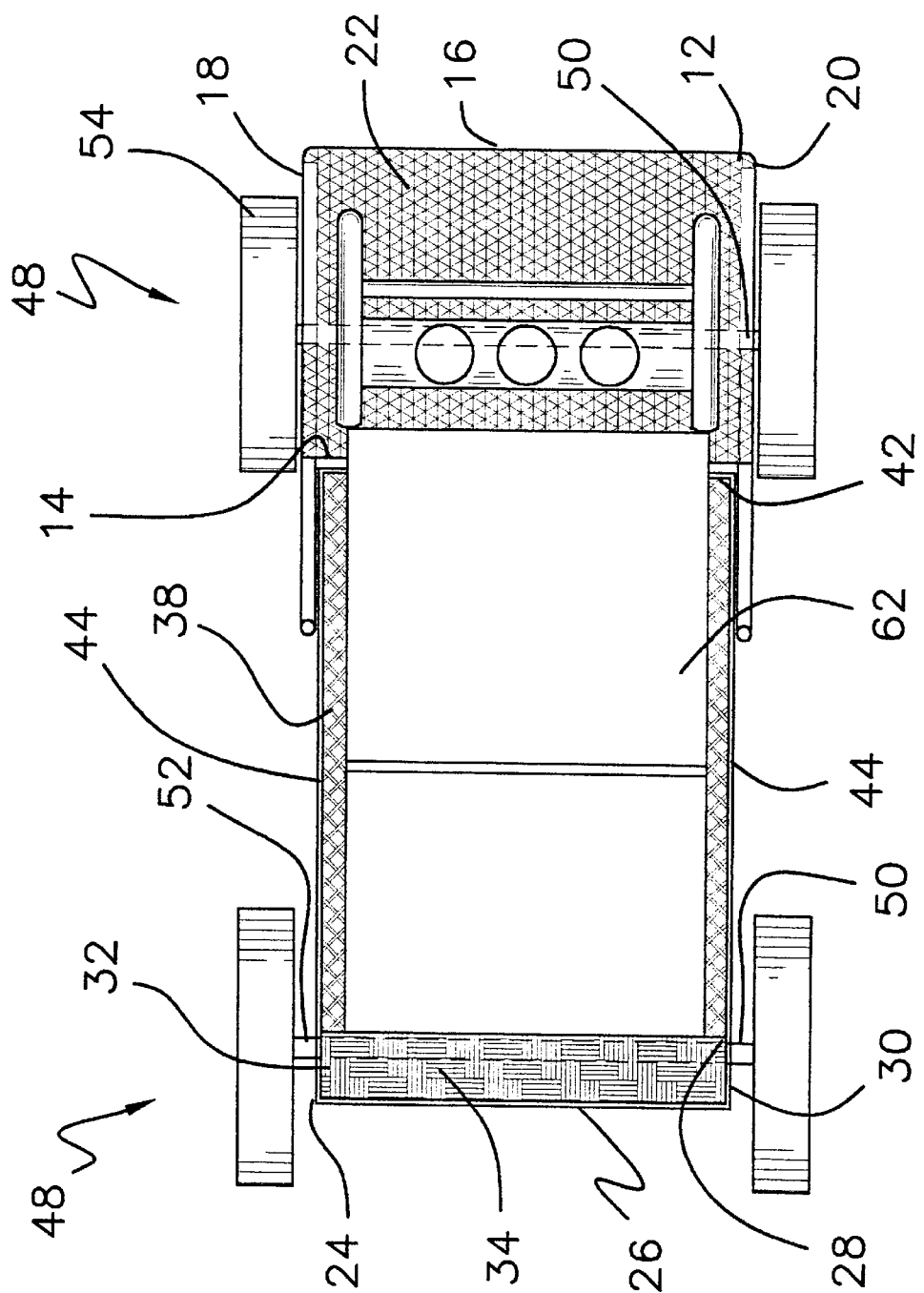
FIG. 2 is a schematic top view of the present invention.

With reference now to the drawings, and in particular to FIGS. 1 through 4 thereof, a new stroller device embodying the principles and concepts of the present invention and generally designated by the reference numeral 10 will be described.

As best illustrated in FIGS. 1 through 4, the stroller device 10 generally comprises a first panel 12 having a first edge 14, a second edge 16, a third edge 18 and a fourth edge 20 wherein the first 14 and second 16 edges are positioned opposite to each other. The first panel 12 has a roughened upper surface 22.

A second panel 24 has a first edge 26, a second edge 28, a third edge 30, and a fourth edge 32 wherein the first 28 and second 30 edges of the second panel 24 are opposite to each other. The second panel 24 has a roughened upper surface 34.

A container 36 has a bottom wall 38, a front wall 40, a back wall 42, and a pair of side walls 44. The container 36 has an open top side 46. A bottom edge of the front wall 40 is attached to and extends along a length of the second edge 28 of the second panel 24. A bottom edge of the back wall 42 is attached to and extends along a length of the first edge 14 of the first panel 12. Preferably, the walls of the container 36 have a plurality of apertures 47 therein such that the container 36 defines a basket. The bottom wall 38 is preferably coplanar with the first 12 and second 24 panels.

Figure 3:
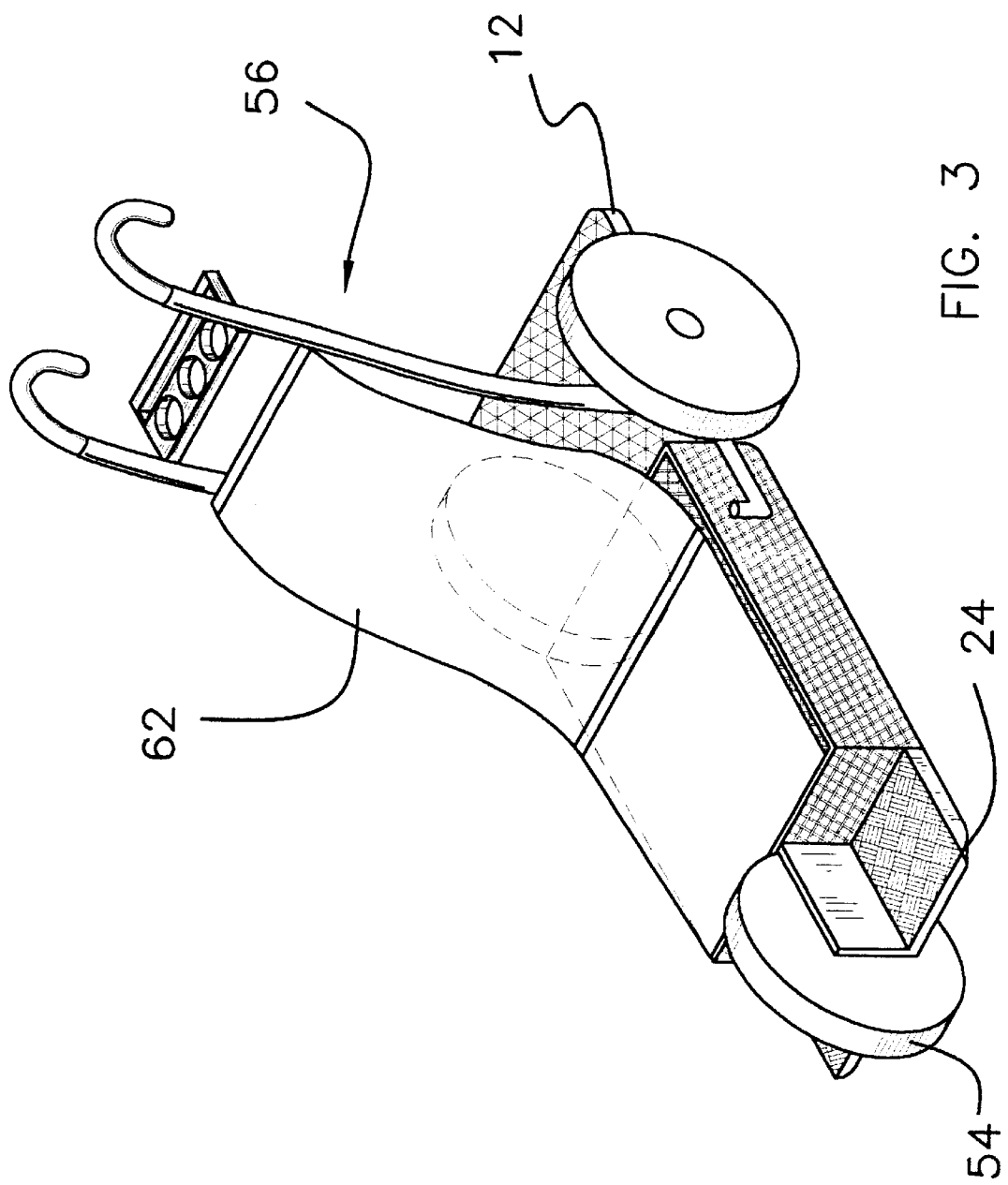
FIG. 3 is a schematic perspective view of the second embodiment of the present invention.
Figure 4:
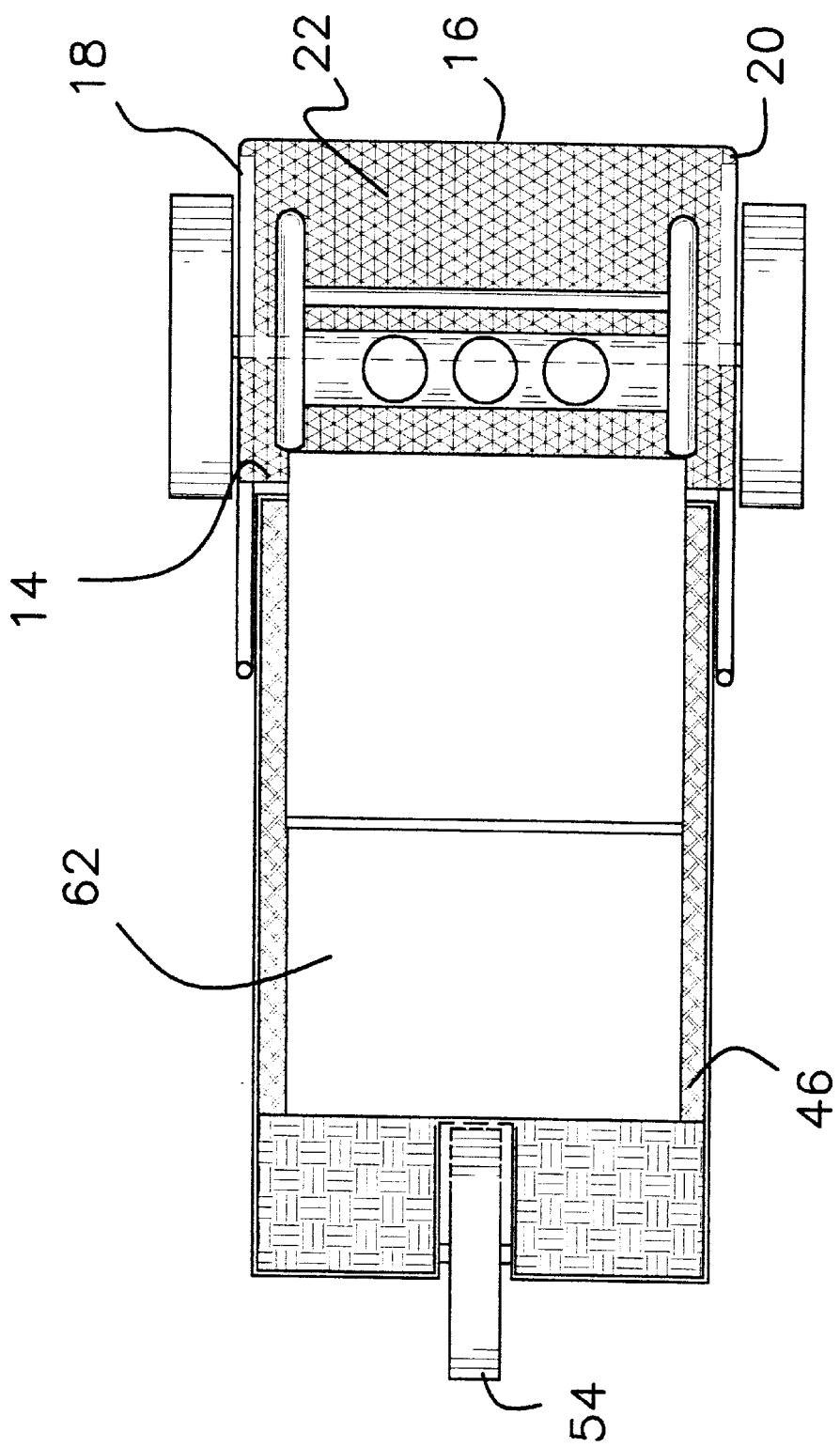
FIG. 4 is a schematic top view of the second embodiment of the present invention.

The device 10 includes a pair of wheel assemblies 48. Each of the wheel assemblies 48 is attached to one of the first 12 and second 24 panels. Each of the wheel assemblies 48 includes a spindle 50 attached to a bottom surface of one of the first 12 and second 24 panels. The spindles 50 extend beyond corresponding third 18, 30 and fourth 20, 32 edges such that each of the spindles 50 has a pair of free ends 52 extending beyond the panels 12, 24. Each of a plurality of wheels 54 is rotatably coupled to one of the free ends 52. FIGS. 3 and 4 shows a second embodiment having a first wheel assembly resembling the ones above and attached to the first panel 12. A second of the wheel assemblies comprises a wheel 54 rotatably mounted in the second panel 24 and extending outwardly from the second panel 24 through the first edge 26 of the second panel 24.

A handle assembly 56 is attached to the upper surface 22 of the first panel 12. The handle assembly 56 includes a pair of pole members 58 extending upwardly from the first panel 12. Each of the pole members 58 has an arcuate end 60 positioned distal to the first panel 12. Ideally, each of the pole members 58 is telescoping.

A seat member 62 is attached to the handle assembly 56 and extends over the container 36. The seat member 62 comprises a sling having a top edge 64 attached to the handle assembly 56 and a bottom edge 66 attached to the front wall 40 of the container 36. The seat member 62 comprises a flexible material. A lowermost portion of the seat member 62 is ideally more than 17 inches off of a ground surface when the wheel assemblies 48 are abutting the ground surface.

A plate 68 extends between the pole members 58 and is generally positioned in a horizontal plane. The plate 68 has a plurality of openings 70 therein each defining a drink holder.

In use, the device 10 is used as a conventional stroller but is designed for older children, such as those from 3 to 8 years of age. The first panel may be stood on by a child and the second panel acts as a foot rest. The height of the seat allows easy sitting for an older child and the sling type seat provides easy exiting from the seat.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stroller device for transporting a child, said device comprising:

a first panel having a first edge, a second edge, a third edge and a fourth edge wherein said first and second edges are positioned opposite t:o each other;

a second panel having a first edge, a second edge, a third edge, and a fourth edge wherein said first and second edges of said second panel are opposite to each other;

a container having a bottom wall, a front wall, a back wall, and a pair of side walls, said container having an open top side, said container being attached to and positioned between said first and second panels such that said bottom wall is generally coplanar with said first and second panels;

a pair of wheel assemblies, each of said wheel assemblies being attached to one of said first and second panels;

a handle-assembly being attached to said upper surface of said first panel; and a seat member being attached to said handle assembly and extending over said container, wherein a bottom edge of said front wall is attached to and extends along a length of said second edge of said second panel, a bottom edge of said back wall being attached to and extending along a length of said first edge of said first panel.

2. The stroller device as in claim 1, wherein said first panel has a roughened upper surface.

3. The stroller device as in claim 1, wherein said second panel has a roughened upper surface.

4. The stroller device as in claim 1, wherein each of said walls of said container has a plurality of apertures therein such that said container defines a basket.

5. The stroller device as in claim 1, wherein each of said wheel assemblies includes a spindle being attached to a bottom surface of one of said first and second panels, each of said spindles extending beyond a corresponding one of said third and fourth edges such that each of said spindles has a pair of free ends extending beyond said panels, each a plurality of wheels being rotatably coupled to one of said free ends.

6. The stroller device as in claim 1, wherein a first of said wheel assemblies includes a spindle being attached to a bottom surface of said first panel, said spindle extending beyond a said third and fourth edges of said first panel such that said spindle has a pair of free ends extending beyond said first panel, each of a pair of wheels being rotatably coupled to one of said free ends, a second of said wheel assemblies comprises a wheel rotatably mounted in said second panel and extending outwardly from said second panel through said first edge of said second panel.

7. The stroller device as in claim 1, wherein said handle assembly includes a pair of pole members extending upwardly from said first panel, each of said pole members having an arcuate end positioned distal to said first panel, each of said pole members being telescoping.

8. The stroller device as in claim 7, further including a plate extending between said pole members, said plate being generally positioned in a horizontal plane, said plate having a plurality of openings therein, said openings defining drink holders.

9. The stroller device as in claim 1, wherein said seat member comprises a sling having a top edge attached to said handle assembly and a bottom edge attached to said front wall of said container, said seat member comprising a flexible material.

10. The stroller device as in claim 9, wherein a lowermost portion of said seat member is more than 17 inches off of a ground surface when said wheel assemblies are abutting said ground surface.

11. A stroller device for transporting a child, said device comprising:

a first panel having a first edge, a second edge, a third edge and a fourth edge wherein said first and second edges are positioned opposite to each other, said first panel having a roughened upper surface;

a second panel having a first edge, a second edge, a third edge, and a fourth edge wherein said first and second edges of said second panel are opposite to each other, said second panel having a roughened upper surface;

a container having a bottom wall, a front wall, a back wall, and a pair of side walls, said container having an open top side, a bottom edge of said front wall being attached to and extending along a length of said second edge of said second panel, a bottom edge of said back wall being attached to and extending along a length of said first edge of said first panel, said walls of said container having a plurality of apertures therein such that said container defines a basket, said bottom wall being generally coplanar with said first and second panels;

a pair of wheel assemblies, each of said wheel assemblies being attached to one of said first and second panels, each of said wheel assemblies including a spindle being attached to a bottom surface of one of said first and second panels, each of said spindles extending beyond a corresponding one of said third and fourth edges such that each of said spindles has a pair of free ends extending beyond said panels, each of a plurality of wheels being rotatably coupled to one of said free ends;

a handle assembly being attached to said upper surface of said first panel, said handle assembly including a pair of pole members extending upwardly from said first panel, each of said pole members having an arcuate end positioned distal to said first panel, each of said pole members being telescoping;

a seat member being attached to said handle assembly and extending over said container, said seat member comprising a sling having a top edge attached to said handle assembly and a bottom edge attached to said front wall of said container, said seat member comprising a flexible material, wherein a lowermost portion of said seat member is more than 17 inches off of a ground surface when said wheel assemblies are abutting said ground surface; and a plate extending between said pole members, said plate being generally positioned in a horizontal plane, said plate having a plurality of openings therein, said openings defining drink holders.

* * * * *